(No Model.)

C. W. ROGERS.

HARNESS PAD.

No. 297,011. Patented Apr. 15, 1884.

Witnesses
C. R. Weaver
Geo. H. Pistel

C. W. Rogers, Inventor
Per
Brashears & Williams
Attorneys

United States Patent Office.

CHARLES W. ROGERS, OF BALTIMORE, MARYLAND.

HARNESS-PAD.

SPECIFICATION forming part of Letters Patent No. 297,011, dated April 15, 1884.

Application filed January 23, 1884. (No model.)

*To all whom it may concern:*

Be it known that I, CHARLES W. ROGERS, residing at Baltimore city, Maryland, have invented certain new and useful Improvements in Harness-Pads, of which the following is a specification, reference being had to the accompanying drawings, forming part thereof, in which—

Figure 1:
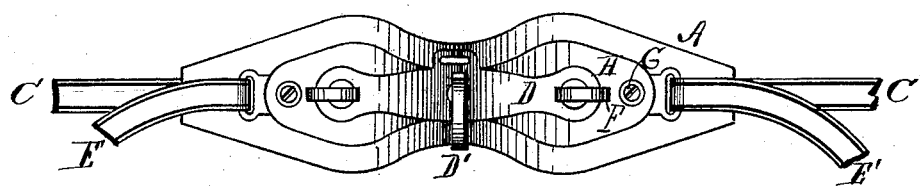
Figure 2:
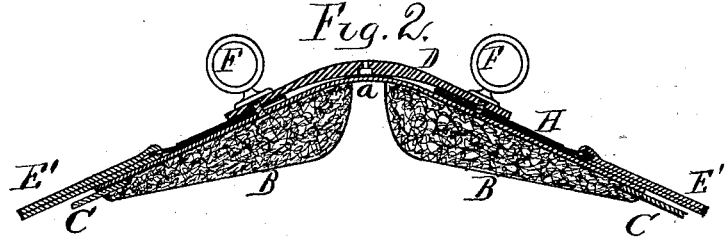
Figure 3:
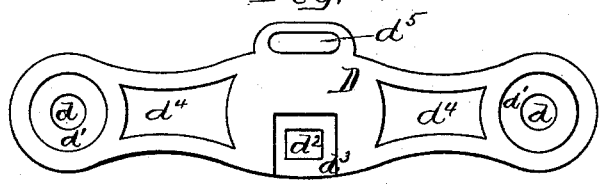
Figure 4:
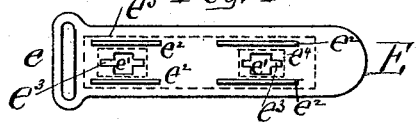
Figure 5:
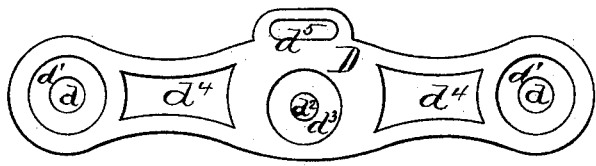

Figure 1 is a view of the pad complete. Fig. 2 is a vertical section therethrough. Fig. 3 is a bottom plan view of the tree. Fig. 4 is a similar view of the plate carrying the backband. Fig. 5 is a bottom view of a tree of slightly modified construction.

Like letters refer to the same parts in all the figures.

In harness-pads as heretofore made, much trouble and annoyance have been caused by the breaking at the center, caused by the rusting of the hook secured thereto, and such pads, in the absence of stiffening-trees, have been liable to gall the back of the horse by continual contact and rubbing, due to their flexibility.

The object of my invention is to furnish a pad which shall embrace in its construction improvements which will obviate these difficulties; and to this end my invention consists in the construction, arrangement, and combination of parts which will be now fully described, and then specifically pointed out in the claims.

Referring to the drawings by letter, A is the top of the pad, which extends from side to side of the horse when in position, and carries the cushions B B. The central part of this pad-top at $a$ is between the cushions, and when in use is immediately over the back of the horse. Secured to each end of the pad, between the top and the cushions, is the bellyband C.

D is a tree made of metal, and which is constructed as shown in Figs. 3 and 5. In these figures are shown the ends of the tree perforated at $d$, countersunk or rabbeted at $d'$, the center perforated at $d^2$, and rabbeted at $d^3$, a circular perforation and rabbet being shown in Fig. 5, and a rectangular perforation and rabbet, the latter extending to the edge of the tree, being shown in Fig. 3. The rectangular rabbet and perforation are adapted to receive a check-rein hook, D', with a square end, and which passes under the tree and into the rectangular rabbet, and is secured in position by a bolt and nut. The circular perforation and rabbet are adapted to receive the end of another style of hook, which is provided with an end which passes through the perforation and is secured by a nut under the tree. The rabbets answer several purposes—viz., to lighten without weakening the structure, and to permit the tree to be easily withdrawn from the mold when cast. The tree is further lightened by parts $d^4$ being hollow, as shown, and is provided with a loop, $d^5$, to receive the front end of the strap, technically termed the "turn-back," which lies along the back of the animal and supports the "breeching" and carries the "crupper." The plate E (shown in Fig. 4) is provided with a loop, $e$, to receive the back-band E', Figs. 1 and 2, rectangular perforations $e'$, ribs $e^2$—on each side of said perforations—and slots $e^3$ at each end of the perforations $e'$. The perforations and ribs are for the purpose of receiving nuts into which the terrets F engage, as do also the bolts or screws G.

In securing the parts together, nuts (as shown in dotted lines at $e^4$ in Fig. 4) are inserted between the ribs $e^2$, a rectangular piece of leather (shown in dotted lines at $e^5$, Fig. 4) is secured thereto by tacks passed through the slots $e^3$, and this structure placed in the position as shown in Fig. 2, the leather $e^5$ resting in a cut-away part of the pad-top. The screws G may now be inserted through a leather covering, H, (see Figs. 1 and 2,) and engaged with one of the nuts $e^4$. The tree is now put into position and secured by screwing in the "terrets" F.

The different metallic parts of the structure herein described are made and sold as saddlery hardware, and may be covered with leather, coated with paint or japan, or plated with gold, silver, nickel, &c.

Having thus described my invention, what I claim is—

1. The plate E, provided with the ribs $e^2$ and loop $e$, and having openings $e'$ to receive the nuts $e^4$ $e^4$, as and for the purposes set forth.

2. The combination, substantially as described, of the pad-top, the tree, the plates E, constructed as described, the nuts $e^4$ $e^4$, and the bolts G G, as and for the purpose set forth.

3. The combination, with the pad, of the tree provided with turn-back strap-loop and check-rein hook, the plate E, having loop $e'$, and the bolts and nuts for connecting the same, as set forth.

4. As an improved article of manufacture, the tree herein described, provided with perforations $d\ d^2$, rabbets $d'\ d^3$, and loop $d^5$, as set forth.

5. The tree provided with perforations $d\ d^2$ and rabbets $d'\ d^3$, in combination with eyebolts and nuts and the check-rein hook, as and for the purpose set forth.

6. As an improved article of manufacture, the tree herein described, provided with perforations $d\ d^2$, and rabbets $d'\ d^3$, and having the turn-back strap-loop $d^5$, made integral therewith, as set forth.

In testimony whereof I have hereunto set my hand in presence of two witnesses.

CHARLES W. ROGERS.

Witnesses:
S. BRASHEARS,
C. R. WEAVER.